(12) United States Patent
Banerjee

(10) Patent No.: US 6,816,510 B1
(45) Date of Patent: *Nov. 9, 2004

(54) METHOD FOR CLOCK SYNCHRONIZATION BETWEEN NODES IN A PACKET NETWORK

(75) Inventor: Subrata Banerjee, Elmhurst, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/501,167

(22) Filed: Feb. 9, 2000

(51) Int. Cl.[7] .................................................. H04J 3/06
(52) U.S. Cl. ...................... 370/503; 370/350; 370/509; 370/510; 370/514
(58) Field of Search .............................. 370/310, 310.1, 370/328, 329, 336, 337, 345, 347, 350, 464, 498, 503, 509, 510, 514

(56) References Cited

U.S. PATENT DOCUMENTS

| | | | |
|---|---|---|---|
| 5,481,753 A | 1/1996 | Miyake et al. ............... 395/823 |
| 5,666,358 A * | 9/1997 | Paratore et al. ............. 370/347 |
| 5,790,608 A | 8/1998 | Benayoun et al. .......... 375/356 |
| 5,886,989 A | 3/1999 | Evans et al. ................. 370/347 |
| 6,069,887 A * | 5/2000 | Geiger et al. ................ 370/338 |
| 6,347,084 B1 * | 2/2002 | Hulyalkar et al. .......... 370/347 |

* cited by examiner

Primary Examiner—Alpus H. Hsu
Assistant Examiner—Thomas E. Volper

(57) ABSTRACT

A method and system for synchronizing clocks in a packet network that includes a master node and at least one slave node that communicate with one another is disclosed. A timer value from a master clock is retrieved upon transmission of a first packet to the slave node. The timer value and an associated code are subsequently sent to the slave node in a subsequent packet. After receiving the first packet, the slave node, retrieves a timer value from a slave clock and associates it with an identifying code of the first packet. After receiving the subsequent packet, the slave node relates the timer values and adjusts a clock value of the slave clock accordingly. An interrupt scheme may be used to implement the retrieval of the timer values.

17 Claims, 1 Drawing Sheet

METHOD FOR CLOCK SYNCHRONIZATION BETWEEN NODES IN A PACKET NETWORK

BACKGROUND OF THE INVENTION

The present invention relates generally to systems and methods for clock synchronization, and, more particularly, to a system and method for synchronizing clocks in packet networks which have variable or fixed length packets and that support variable synchronization intervals.

Communications networks, particularly wireless networks, typically employ a multiple-access protocol that is designed to prevent collisions of data packets due to simultaneous transmission of the data packets by multiple transmitters in the network using the same channel. One protocol that has come into widespread use is known as Time-Division Multiple Access (TDMA). In general, in accordance with the TDMA protocol, channel time is divided into small time slots, each of which is assigned to a different node (user). This time slot assignment can either be fixed (classical TDMA), or variable (reservation-based TDMA). In either case, since the number of nodes (users) is finite, the data is usually transmitted in TDMA "frames", which ensure that the delays encountered by the different users are finite.

Clocks at two nodes in the network must be synchronized, up to a tolerance limit, to support the various network enabled operations such as the transmission of real time traffic, e.g., video data. Because clocks at different network nodes do not 'tick' at exactly the same frequency, the clocks tend to draft apart over time. The drift rate depends on how accurate (i.e., how expensive) the clocks are. Clocks commonly used in consumer devices and network equipment are rated in the neighborhood of 50–100 ppm (parts per million). That is, in the worst case, they can drift by as much as 1 millisecond in 10 seconds.

In a TDMA network, it is necessary that all transmitters and receivers in the network be synchronized in terms of the TDMA frame. An incorrectly synchronized transceiver, at best, cannot communicate, but, at worst, can cause the entire TDMA network to collapse if appropriate safeguards are not built into the protocol. It should be recognized that TDMA frame synchronization is not the same as clock synchronization of a modem, which is a function of the Physical layer (PHY). Usually, frame synchronization is achieved using a centralized control strategy implemented by a central controller (CC). However, frame synchronization can also be implemented in a distributed fashion.

In most TDMA networks, a universal time reference is required to properly allocate resources for transmission. This universal time reference is usually provided in the form of a "timestamp", e.g., which specifies the current time. The timestamps are broadcast periodically by the central controller, and are used by the end terminals (WTs) to synchronize their "timestamp" registers.

For example, clock synchronization between two nodes connected via a direct wired or wireless link can be established as follows. A master clock copies its clock value, i.e., timestamp, in a packet and transmits that packet to a receiver at a predetermined interval. The receiver, upon receiving the packet compares the timestamp in the packet with its own timer value. If the values do not match, the time value at the receiver is adjusted accordingly.

There are, however, several shortcomings to, and limitations of, this approach. First, in order to work properly, this approach needs to know when the medium connecting the two nodes is free from other traffic. When the medium if free, the transmitter assembles the packet by computing data such as a CRC (cyclical redundancy code), FEC (forward error correction) and other header-type information. The transmitter also inserts the timestamp into the packet. These operations may take a variable amount of time depending on the packet size and other factors. This time variable may cause the transmission of the timestamp to be delayed.

Second, by the time the packet including the timestamp is assembled, the medium connecting the two nodes may become busy which would require discarding the assembled packet. The next disadvantage is that the layer with the time (i.e., the timer) needs to have direct access to the physical layer in order to find out if the medium connecting the two nodes is free or not. This information may not be available from different-types of physical layer implementations. In addition, the transmitter and receiver hardware need to deal with multiple real-time events in a short time frame such as checking the availability of the medium, inserting the timestamp in a packet, calculating the necessary header values, error checking and correction codes and transmitting the packet as soon as possible.

For example, in a reservation-based TDMA protocol, there are many problems with this timestamp-based approach. The reservation-based TDMA protocol has an interval during which the timestamp update must be sent. Otherwise, the timing jitter may be larger than what can be handled by a particular application, e.g., an MPEG decoder. The transmission of the timestamp value must also be reserved, and subsequently, other data must also be queued for transmission. In order to ensure efficient use of processor resources (which must be used for managing many other functions), this queuing is usually scheduled in advance. However, the timestamp value cannot be obtained until the exact time of transmission. Further, the queuing of the data packets behind the timestamp value cannot be done before the timestamp value is obtained. Of course, it is possible to switch the data stream between two separate queues with one holding the timestamp value and the other holding the data. However, this solution is quite complicated and requires precise synchronization.

A greater understanding of this problem can be gained by considering the case of a wireless asynchronous transfer mode (ATM) network that uses a reservation-based medium-access control (MAC) protocol. Broadband-ISDN, for example, typically uses ATM as the link layer of the network protocol. The MAC protocol implementation depends on a periodic control-data-frame (CDF). Each CDF contains many phases, during which both control and data information is sent from both the base station (BS) and the wireless terminal (WT). In this context, the BS corresponds to the previously described central controller (CC) and the WT corresponds to the previously described end terminal (WT).

The hardware design is based on the BS and each WT keeping the same timestamp values as a basis for computing the various phases of a CDF. All must maintain the same time periods in order to communicate and transfer packets effectively. All must synchronize their timestamps periodically, by copying the base station value, and all must take starting time directives from the BS.

The MAC processor is assumed to be interrupt-driven for both the WTs and the BS. The BS determines the timing for the entire system. Using the timestamp value as a reference, it determines the exact time when each of the phases operates. This timing information is sent during a certain phase. Since all phases are successive to each other, the WT and the BS set up a counter for the next phase based on the timing information, which then triggers an interrupt to the processor when the counter overflows. The processor must finish its functions during the respective phase within the time allotted and be prepared for the next phase.

For timestamp synchronization, the BS can be assumed to send a timestamp value during the certain phase. However, the BS may be busy storing packets intended for transmission during the certain phase. Consequently, the normal transmission stream must be stopped to allow for the timestamp value to be loaded from the timestamp register during the time of transmission. This solution is not desirable since it conflicts with the direct data path.

It should be appreciated that the problem described above is not due to the particular protocol considered, but is generally due to the reservation-based nature of the protocol, whereby decisions on what is transmitted at particular times are made in advance of those times.

In U.S. patent application Ser. No. 09/086,270, filed on May 28, 1998, the teachings of which are expressly incorporated herein, a two-step method was presented for synchronizing timestamps in a network (e.g., a wireless ATM network) that included a control node (BS) and a plurality of other nodes (WTs) which communicate with one another over a common channel mediated by a medium-access control (MAC) subsystem (e.g., one that uses a reservation-based TDMA protocol). Specifically, timestamp information is sent from the BS in two steps. First a command is sent to capture the current timestamp value (using a command timestamp_get). Then the captured timestamp value is sent at a later transmission (using a command timestamp_load), which is then used by the devices to adjust their timestamp value.

In U.S. patent application Ser. No. 09/217,470 filed on Dec. 21, 1998, the teachings of which are expressly incorporated herein, a one-step timestamp update method was presented to distribute the timestamp value among all transceivers in the network. Specifically, it combines the timestamp_get and timestamp_load commands in the two-step method described in the '270 application into a single command, called the timestamp command. At the BS, when the timestamp command is sent from MAC to PHY over the MAC-PHY interface, the current timestamp value at the BS is captured from the MAC-PHY interface. Except at power-on, the timestamp value contained in the timestamp command and the captured timestamp value should be equal. The captured timestamp value is then added by a timestamp update interval, T, and stored to become the timestamp value included in the next timestamp transmission exactly T seconds later. The value of T can be varied at the BS as different physical conditions arise.

At each WT, when the timestamp command is received by PHY and sent to MAC over the MAC-PHY interface, the current timestamp value at the WT is captured from the MAC-PHY interface. The captured timestamp value is then compared with the timestamp value contained in the timestamp command and the difference, if any, is stored in an offset_register. This offset value will later be added to the timestamp counter in a non-time-critical manner under software control before the arrival of the next timestamp command.

Although the methods and systems discussed in the '270 and '470 applications provide significant flexibility in the design of software for the MAC protocol by allowing data and timestamp packets to be scheduled for transmission before the actual time of transmission, both of these approaches assume the context of a reservation-based and time division system (TDMA) under the control of a central controller (CC) or base station. The clocks are synchronized at fixed regular intervals. It is also assumed that there exists fixed cycles or packet sizes in the network.

There thus exists in the art a need for a clock synchronization method in packet networks that is not limited to synchronizing clocks at fixed regular intervals or the need for fixed cycles or packet sizes.

SUMMARY OF THE INVENTION

An object of the invention claim herein is to overcome the shortcomings and limitations of the methods and systems described above.

Other objects of the invention include to provide a simple a method for clock synchronization which can be employed in a variety of networks such as distributed (e.g., IEEE802.11) or centralized configurations, networks with fixed or variable packet sizes, and TDMA and non-TDMA based systems.

Another object of the invention is to provide a method that does not require information on whether the communication medium is availability is known or not.

Generally, various embodiments of the invention are directed to a synchronization approach that:

(a) can be employed to a variety of networks—wired as well as wireless, even with unpredictable packet processing delays at the MAC and PHY layers;

(b) can be simply and cheaply implemented with minimum real-time overhead (i.e., packet contents need not be processed in real-time);

(c) has minimum overhead in terms of the network capacity that is used; and (d) supports flexible and variable synchronization intervals.

One aspect of the invention is related to a method for synchronizing clocks in a packet network that includes a master node and at least one slave node that communicate with one another. The method includes the step of retrieving a first timer value at the end of transmission of a current packet from the master node to the slave node. The current packet has an identifying code. The method also includes inserting the first timer value and the identifying code of the current packet into a subsequent packet to be sent to the slave node, upon receiving the current packet by the slave node, retrieving a second timer value from the slave node and associating the second timer value with the identifying code of the current packet. The method further includes transmitting the subsequent packet to the slave node, comparing the identifying code in the subsequent packet with the identifying code associated with the second timer value, calculating a difference between the first and second timer values if the identifying codes match, and adjusting a clock value in the slave node in accordance with the calculated difference.

Another aspect of the invention is related to a packet communication system including a master node including first controller and a first memory and at least one slave node including second controller and a second memory. The first processor is configured to execute the code stored in the first memory so as to retrieve a first timer value from a master clock at the end of transmission of a current packet to the slave node, the current packet having an identifying code, to assemble a subsequent packet, including the first timer value and the identifying code of the current packet, and to transmit the subsequent packet to the slave node. The second processor is configured to execute code stored in the second memory so as to retrieve a second timer value upon receiving the current packet from the master node, to associate the second timer value with the identifying code of the current packet, to receive and compare the identifying code in the subsequent packet with the identifying code associated with the second timer value, to calculate a difference between the first and second timer values if the identifying codes match, and to adjusts a clock value in the slave node in accordance with the calculated difference.

These and other aspects and embodiments of the present invention are exemplified in the following detailed disclosure.

DETAILED DESCRIPTION

Figure 1:
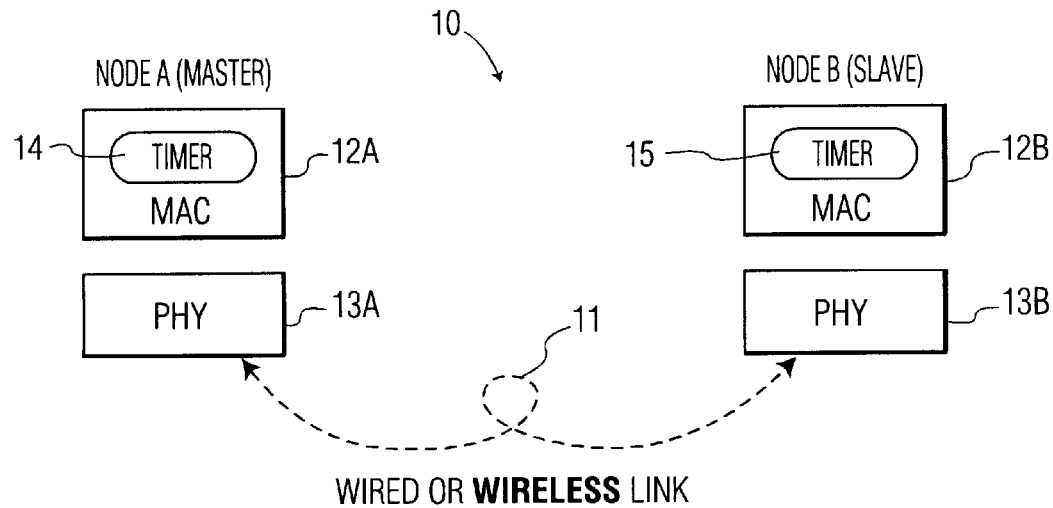
FIG. 1 is a diagram that depicts a packet network in accordance with an exemplary implementation of the present invention.

Referring to FIG. 1, Node A and Node B form part of a digital packet switching network 10. While only two nodes are shown, the packet network 10 may include any number of nodes. In addition, any node in the packet network may be assigned at a given time to be the master node. A communication link 11 between the Nodes A and B may include, for example, hybrid Fiber Coaxial (HFC) channels, wireless channels or any other suitable transmission medium.

The Nodes A and B include a plurality of layers which preferably include a MAC layer 12A/B and a PHY layer 13A/B, respectively. The plurality of layers perform various control and data processing functions. In this embodiment, the Node A includes a timer 14 (i.e., master clock). The Node B includes a timer 15 (i.e., slave clock). The master clock may be a free running clock such as a cesium, rubidium or Global Position Satellite (GPS) based clock. The master clock may also be synchronized to a network reference (e.g., a stratum I telecommunication reference). The slave clock of Node B is to be synchronized to the master clock of Node A.

Figure 2:
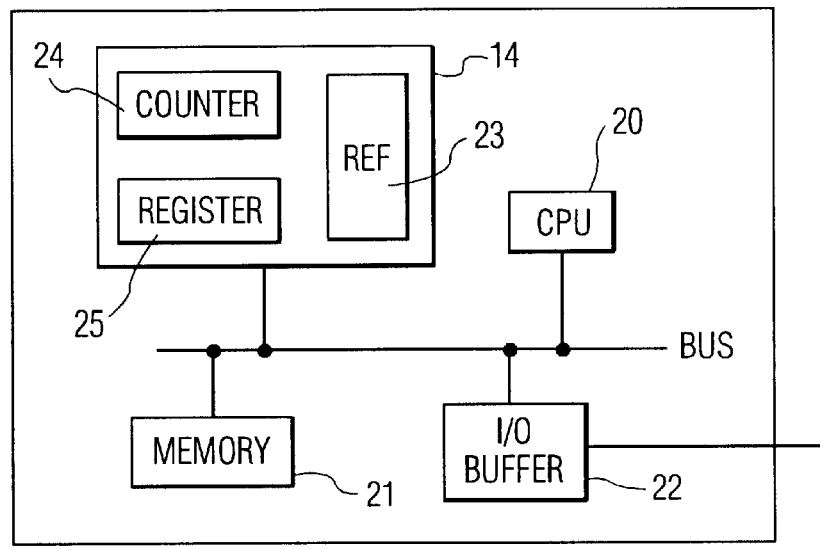
FIG. 2 is a block diagram of a Node in accordance with one embodiment of the invention.

The Nodes A and B comprise hardware and software that enable packet communication between the Nodes. Illustratively, as shown in FIG. 2, the Node A includes a controller 20, a memory 21 for storing data and an input/output packet buffer 22. The timer 14 (and 15) includes a time reference 23, a timestamp counter 24 and a timer value register 25.

The operations perform at the Master Clock (Node A) side includes the following. The MAC layer 12A receives a packet 16 from a higher layer. The MAC layer 12A performs the processing necessary at this layer on the packet 16 and then forwards it to the PHY layer 13A. It should be understood that the packet 16 is one of a plurality of packets that are transmitted and received by various nodes in the packet network 10. Typically, these packets are communicated as a sequence of packets because all the information needed to be sent from one point to another can not be placed in one packet.

Figure 3:
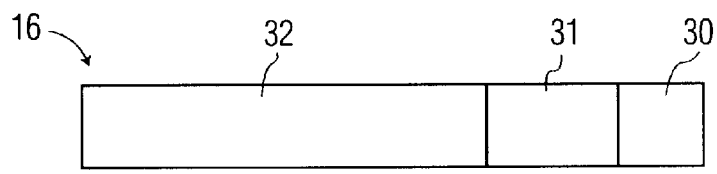
FIG. 3 is a block diagram of a packet in accordance with a preferred embodiment of the invention.

As shown in FIG. 3, the packet 16 may include a sequence number 30, MAC messages 31 and digital data 32. The MAC messages 31 are used by the MAC layer 12A discussed above. The MAC messages 31 may include a timebase marker for synchronizing various clocks in the packet network. The MAC messages 31 also include control data for a network interface unit, e.g., to control the data transmission rate. The digital data 32 can comprise any suitable data stream such as Moving Picture Expert Group-2 (MPEG-2) or Asynchronous Transfer Mode (ATM) data. The packet 16, however, is not limited to this structure. The timebase marker or timer value may be place in other portions or sections of the packet 16.

The sequence number 30 is used to protect the clock synchronization methods from lost packets. For example, in wireless networks, under certain situations the PHY layer 13A may believe that a packet was transmitted successfully, however, that packet may have actually collided with other packet(s) and become "lost" in the neighborhood of the Node B. The Sequence number 30 is generally used for error and flow control purposes in packet networks. By checking the sequence number 30, the PHY layer 13A can determine if the proper number of packets have been transmitted and received.

After receiving the packet 16, the PHY layer 13A performs its own necessary processing of the packet 16. The PHY layer 13A then waits for the communication link 11 connecting the Node A and the Node B to become available. As discussed above, the amount of time or delay for the communication link 11 to become available may be an unpredictable/variable amount of time.

When the communication link 11 becomes available the PHY layer 13A starts transmission of the packet 16 to the Node B. After or at the end of transmission of the packet 16, the MAC layer 12A retrieves a current timer value of the timer 14 and holds/stores it locally in its memory along with an associated sequence number. The associated sequence number is the sequence number 30 of the packet 16 that was just transmitted to the Node B.

Preferably, when the last bit of the packet 16 leaves the PHY layer 13A of Node A, the PHY layer 13A generates an interrupt signal to the MAC layer 12A. The interrupt signal can be generated in a variety of ways: (1) via a hardware line to an interrupt controller/input in the MAC layer 12A, (2) by setting a predetermined bit in a shared memory that is accessible by both the MAC layer 12A and the PHY layer 13A, (3) by sending a predetermined command from the PHY layer 13A to the MAC layer 12A. Other methods of sending the interrupt signal may also be used depending on the desired synchronization accuracy and implementation platform/cost.

The MAC layer 12A, upon receiving the interrupt signal, notes a clock or timer value from the timer 14. This timer value and the associated sequence number 30 are stored for transmission in the next packet 16. In the next packet 16 or in one of the subsequent packets (which would be sent shortly), the Node A sends the stored timer value and the associated sequence number to the Node B. As discussed above, this information may be included as part of the MAC message 31.

The operations performed at the slave clock (Node B) side include the following. Upon successfully receiving the last bit of the packet 16 from Node A, the PHY layer 13B sends an interrupt signal to the MAC layer 12B. The MAC layer 12B then retrieves the current clock/timer value from the timer 15. The timer value is then stored.

The MAC layer 12B then (1) processes the packet 16 as it would normally and (2) determines the sequence number 30 of the packet 16 just processed. The determined sequence number 30 is then stored with the stored timer value from the timer 15. In the next packet or in a subsequent packet in which the Node B receives a timer value and an associated sequence number from the Node A, the received sequence number 30 is compared to the previously stored sequence number (i.e., predetermined value which has been retained or stored by the Node B). If they match, then the difference between the currently received timer value from timer 14 and the previously stored timer value from timer 15 is calculated. The timer value at Node B is then adjusted based on the calculated difference. This allows for flexible and variable synchronization intervals and times.

The matching of sequence number ensures that (1) the clocks are only synchronized when the proper sequence of packets have been received by the Node B and (2) the proper timer values are compared. Other identifying codes, similar to the sequence numbers, or data related to the packets 16 can also be use to ensure that the proper timer values are compared.

As will also be appreciated, the number of real-time operations for clock synchronization are limited. Significantly, the transmitter and receiver hardware and software are not burdened with processing the packet data, waiting for the communication medium and performing clock synchronization all in real-time. Accordingly, even if the time required to wait for the communication medium and the processing time of a packet to be transmitted is variable or even unpredictable, clock synchronization can be performed.

The only real-time operations needed for clock synchronization are generation of the interrupt signal (1) when the last bit of the packet 16 leaves the Node A and (2) when the last bit of the packet 16 arrives at the Node B. These are non-complicated operations that are generally supported by typical PHY layers (e.g., radios). In addition, the timer value at the Node A must be noted upon the MAC layer 12A receiving the interrupt signal. The timer value at the Node B must also be noted upon the MAC layer 12B receiving the interrupt signal. Lastly, the timer 15 at Node B must be updated with the calculated difference. These operations can be performed by software or hardware easily within the real-time constraints.

The timer value from the Node A can be sent in every packet, every x packets (x=any positive integer variable), or when requested by a slave node, depending on the accuracy required. In the case of the timer value being sent every x packets, the Node B would only need to monitor the arrival of the last bit for every x packets. The value of x can even be adjusted based on the absolute value of the calculated differences of the timer values at the receiver. For example, if the calculated difference becomes too large then the timer values (i.e., clock synchronization information) can be send more frequently, and vice versa.

In another embodiment, the Node B (i.e., the receiver or slave node) timestamps the arrival of last bit event for every packet. The previously stored timestamp and sequence number are replaced with the currently received values. When the receiver determines that the timer value and the associated sequence number are contained in a received packet, the receiver then performs the synchronization operations described above. If the Node A is not able to send the timer value of last-bit-departure event in the very next packet (due to other processing requirements) then it can send it in a later packet. In that case, the receiver needs to store the timestamps and sequence numbers of last-bit-arrival events of multiple packets. The only overhead in this case would be the additional memory requirement at the receiver. Typically, a master clock is able to send the timestamp of last-bit-departure event within a couple of packets.

The timer/clock synchronization can be made more accurate by incorporating the propagation delay (of the last bit) from the Node A to the Node B. This propagation delay depends on the distance between the Node A and the Node B, and the medium used to transmit the packet 16. The propagation delay can be calculated if the distance between the clock master and clock slave is known. The timer 15 is then adjusted based upon the calculated difference, discussed above, and the propagation delay.

The clock synchronization method of the present invention can be used with a variety of applications including wireless, TDMA and ATM applications. The invention can also be used with most of the existing radios with or without built-in MAC layers.

Although the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

What is claimed is:

1. A method for synchronizing clocks in a packet network that includes a master node and at least one slave node, said method comprising the steps of:
   retrieving a first timer value at the end of transmission of a current packet from the master node to the slave node, the current packet having an identifying code;
   inserting the first timer value and the identifying code of the current packet into a subsequent packet to be sent to the slave node;
   upon receiving the current packet by the slave node, retrieving a second timer value from the slave node;
   associating the second timer value with the identifying code of the current packet;
   transmitting the subsequent packet to be sent to the slave node;
   comparing the identifying code in the subsequent packet with the identifying code associated with the second timer value;
   calculating a difference between the first and second timer values if the identifying codes match; and
   adjusting a clock value in the slave node in accordance with the calculated difference.

2. The method according to claim 1, wherein the packet network is a wireless network, the master node is a base station, and the slave node is a wireless terminal.

3. The method according to claim 1, wherein the master node and the slave node include a medium-access control (MAC) subsystem.

4. The method according to claim 2, wherein the packet network is an ATM network.

5. The method according to claim 1, wherein any selected one node in the packet network can be assigned to serve as the master node at different times.

6. The method according to claim 1, wherein the end of the transmission of the current packet is after the last bit of the current packet is sent from the master node, and upon receiving the current packet is after the last bit of the current packet is received by the slave node.

7. The method according to claim 1, wherein said steps of retrieving the first and second timer values are interrupt driven.

8. The method according to claim 1, wherein the first timer value is sent in every X packets to be transmitted to the slave node, where X is a positive integer.

9. The method according to claim 1, wherein said adjusting step includes adjusting the clock value based upon the calculated difference and a predetermined propagation delay.

10. The method according to claim 1, wherein the identifying code comprises a packet sequence number.

11. The method according to claim 1, wherein the first timer value is sent upon demand by the slave node.

12. A packet communication system, comprising:
- a master node including a first controller and a first memory; and
- at least one slave node including a second controller and a second memory,
- wherein said first controller is configured to execute code stored in said first memory so as to retrieve a first timer value from a master clock at the end of transmission of a current packet to the slave node, the current packet having an identifying code, to assemble a subsequent packet, including the first timer value and the identifying code of the current packet, and to transmit the subsequent packet to the slave node, and
- wherein said second controller is configured to execute code stored in said second memory so as to retrieve a second timer value upon receiving the current packet from the master node, to associate the second timer value with the identifying code of the current packet, to receive and compare the identifying code in the subsequent packet with the identifying code associated with the second timer value, to calculate a difference between the first and second timer values if the identifying codes match, and to adjust a clock value in the slave node in accordance with the calculated difference.

13. The system according to claim 12, wherein the retrieving of the first and second timer values are interrupt driven.

14. The system according to claim 12, wherein the code in said second memory includes adjusting the clock value based upon the calculated difference and a predetermined propagation delay.

15. A packet communication system that includes a master node and at least one slave node that communicate with one another, said system comprising:
- means for retrieving a first timer value at the end of transmission of a current packet from the master node to the slave node;
- means for assembling a subsequent packet, including the first timer value, for transmission to the slave node;
- means for retrieving a second timer value upon receiving the current packet by the slave node;
- means for relating the first and second timer values; and
- means for adjusting a clock value in the slave node in accordance with a calculation based upon first and second timer values.

16. The system according to claim 15, wherein the subsequent packet includes an identifying code for the current packet.

17. The system according to claim 16, wherein the identifying code comprises a packet sequence number.

* * * * *